US012157403B2

(12) United States Patent
Zuo et al.

(10) Patent No.: US 12,157,403 B2
(45) Date of Patent: Dec. 3, 2024

(54) ADJUSTING APPARATUS FOR ACHIEVING LYING POSTURE IN VEHICLE SEAT

(71) Applicant: Magna Seating Research & Development (Chongqing) Co., Ltd., Chongqing (CN)

(72) Inventors: Jiale Zuo, Shanghai (CN); Guogang Chen, Shanghai (CN); Lei Xue, Shanghai (CN)

(73) Assignee: Magna Seating Research & Development (Chongqing) Co., Ltd., Chongqing (CN)

( * ) Notice: Subject to any disclaimer, the term of this patent is extended or adjusted under 35 U.S.C. 154(b) by 92 days.

(21) Appl. No.: 18/064,899

(22) Filed: Dec. 12, 2022

(65) Prior Publication Data
US 2023/0158925 A1    May 25, 2023

Related U.S. Application Data

(63) Continuation of application No. PCT/CN2020/131490, filed on Nov. 25, 2020.

(30) Foreign Application Priority Data

Jun. 10, 2020  (CN) ......................... 202021058453.7
Jul. 6, 2020   (CN) ......................... 202010639861.X

(51) Int. Cl.
    *B60N 2/16*  (2006.01)
(52) U.S. Cl.
    CPC ................................. *B60N 2/1695* (2013.01)

(58) Field of Classification Search
    CPC ........ B60N 2/34; B60N 2/1695; B60N 2/995; B60N 2/02253
    See application file for complete search history.

(56) References Cited

U.S. PATENT DOCUMENTS

| 4,903,931 A * | 2/1990 | Shimazaki ........... B60N 2/1695 248/421 |
| 2003/0230695 A1 | 12/2003 | Becker et al. |
| 2020/0331366 A1 * | 10/2020 | Line ..................... B60N 2/1695 |

FOREIGN PATENT DOCUMENTS

| CN | 208682692 U | 4/2019 |
| CN | 110293883 A | 10/2019 |

(Continued)

OTHER PUBLICATIONS

Internation Search Report of PCT/CN2020/131490, Mailed Mar. 11, 2021.

*Primary Examiner* — Milton Nelson, Jr.

(57) ABSTRACT

An apparatus for adjusting lying posture in vehicle seats is connected between a lower side of a height adjusting mechanism of the seat and upper sides of upper sliding rails of the seat and comprises an upper fixed bracket, a front end execution mechanism, a front end supporting and driving mechanism and a rear end bracket assembly. The upper fixed bracket is provided with a front end fixed supporting rod, a left end and a right end of which are connected with a left fixed supporting rod and a right fixed supporting rod respectively; inner sides of the left fixed supporting rod and the right fixed supporting rod are connected with a left fixed bracket and a right fixed bracket respectively; and a connecting hole is formed in each of front parts and rear parts of the left fixed supporting rod and the right front end fixed supporting rod.

2 Claims, 4 Drawing Sheets

(56) References Cited

FOREIGN PATENT DOCUMENTS

| CN | 210591495 U | 5/2020 | | |
|---|---|---|---|---|
| CN | 111746361 A | 10/2020 | | |
| DE | 4240943 A1 | * | 5/1994 | ........... B60N 2/0825 |
| DE | 202004020657 U1 | * | 11/2005 | ............. B60N 2/045 |

* cited by examiner

ADJUSTING APPARATUS FOR ACHIEVING LYING POSTURE IN VEHICLE SEAT

CROSS-REFERENCE TO RELATED APPLICATIONS

This application is a continuation of International Patent Application No. PCT/CN2020/131490 with a filing date of Nov. 25, 2020, designating the United States, now pending, and further claims priority to Chinese Patent Application No. 202021058453.7 with a filing date of Jun. 10, 2020, Chinese Patent Application No. 202010639861.X with a filing date of Jul. 6, 2020. The content of the aforementioned applications, including any intervening amendments thereto, are incorporated herein by reference.

TECHNICAL FIELD

The present invention belongs to the technical field of vehicle fittings, and mainly relates to an adjusting apparatus for an integral posture in a vehicle seat.

BACKGROUND OF THE PRESENT INVENTION

With the increasing popularity of vehicle travel and the improvement of social life level, a passenger has a higher requirement for comfort and functionality, particularly for a front passenger seat or rear independent seat. On the basis of meeting the basic riding requirement for a seat, the passenger further expects that the seat can achieve a lying posture (particularly, a special position with "zero gravity") through adjustment with a mechanism to achieve a maximum comfort degree on the basis of meeting a basic seat adjusting function.

The position with "zero gravity" is achieved in such a way that, according to a principle of relaxation in a space capsule, linkage drive is employed for legs, buttocks and a back to enable a heart and knees to be in a same horizontal plane, so that a stress area of a human body is increased, and pressure applied to various portions of the body is balanced. This position has the main beneficial effect that pressure applied to a spine is relieved, which may at least alleviate pain of a back to a certain degree in general. Besides, the passenger is easily tired after a long-time ride; and if the seat can achieve the lying posture for a short rest, the riding comfort requirement for the vehicle seat is better met.

Adjustment on the seat is generally classified into front-rear adjustment, height adjustment, backrest adjustment, waist adjustment, shoulder adjustment, leg rest adjustment and the like. At present, an adjusting mechanism capable of achieving the lying posture in the seat and a corresponding structure either raise the seat to increase a distance between a center line of connected shafts, corresponding to legs and the body, and a lower sliding rail, moving back and forth, of the seat in order to achieve a zero gravity function, or bring a certain difficulty to mounting and maintenance of the seat due to a complex interior structure.

SUMMARY OF PRESENT INVENTION

A purpose of the present invention is to overcome the defects of seat raising, complex structure, high manufacturing cost and difficulty in mounting and maintenance in an adjusting mechanism for a lying posture in a vehicle seat in the prior art, to provide an adjusting apparatus for a lying posture in a vehicle seat, which is simple, compact, convenient, rapid, independent in structure and low in cost.

The purpose of the present invention is implemented by the following technical solution: An adjusting apparatus for achieving a lying posture in a vehicle seat is connected between a lower side of a height adjusting mechanism of the seat and upper sides of upper sliding rails of the seat and comprises an upper fixed bracket, a front end execution mechanism, a front end supporting and driving mechanism and a rear end bracket assembly.

The upper fixed bracket is provided with a front end fixed supporting rod, a left end and a right end of which are fixedly connected with a left fixed supporting rod and a right fixed supporting rod respectively; inner sides of the left fixed supporting rod and the right fixed supporting rod are fixedly connected with a left fixed bracket and a right fixed bracket respectively; and a connecting hole is formed in each of front parts and rear parts of the left fixed supporting rod and the right front end fixed supporting rod for being hinged to front and rear adjusting rods on a left side and a right side of the height adjusting mechanism.

The front end execution mechanism comprises a hollow horizontal pipe; a left execution bracket and a right execution bracket are symmetrically welded to the hollow horizontal pipe; a left fixed bracket connecting hole of the left fixed bracket is hinged to a left traction connecting hole of the left execution bracket; a right fixed bracket connecting hole of the right fixed bracket is hinged to a right traction connecting hole of the right execution bracket; a middle part of the hollow horizontal pipe is welded to a connecting bracket; an included angle between the connecting bracket and each of the left execution bracket and the right execution bracket is a proper obtuse angle; a left welding nut and a right welding nut are welded to two ends of the hollow horizontal pipe; a left boss bolt and the left welding nut are connected with each other through a left bushing; a right boss bolt and the right welding nut are connected with each other through a right bushing; and a lower end of the connecting bracket is rotationally connected with a front end of a motor lead screw through a drive connecting hole.

The front end supporting and driving mechanism comprises a motor base connected with a left upper sliding rail and a right upper sliding rail through bolts; a motor is fixed to the motor base through a motor connecting bolt; bottom ends of a left motor bracket and a right motor bracket are fixedly connected to the motor base through welding; and upper ends of the left motor bracket and the right motor bracket are rotatably connected to the front end execution mechanism.

The rear end bracket assembly comprises a left rear bracket fixedly connected with the left upper sliding rail through bolts and a right rear bracket fixedly connected with the right upper sliding rail using bolts symmetrically; a left rear supporting rod is rotationally connected with the left rear bracket using a boss bolt; and a right rear supporting rod is rotationally connected with the right rear bracket using a boss bolt.

The apparatus is connected between the lower side of the height adjusting mechanism of the seat and the upper sides of upper sliding rails of the seat; various adjusting mechanisms comprise the height adjusting mechanism, a front-rear adjusting mechanism making the seat pass through the upper sliding rails and a seat pitch angle adjusting apparatus, which may be independently operated without interfering each other and are operated briskly.

As a preferred solution, if a distance between hinged rotating axes of the two ends of the left execution bracket and the right execution bracket is a, a distance between an axis of the left fixed bracket connecting hole and the right fixed bracket connecting hole and an axis of the left fixed supporting rod connecting hole and the right fixed supporting rod connecting hole is b, a distance between an axis of the left upper connecting hole of the left rear supporting rod and the right upper connecting hole of the right rear supporting rod and an axis of the boss bolt for connecting the left rear supporting rod and the boss bolt for connecting the right rear supporting rod is c, and a distance between an axis of the left motor bracket connecting hole and the right motor bracket connecting hole and an axis of the boss bolt for connecting the left rear supporting rod and the boss bolt for connecting the right rear supporting rod is d, then $$a:b:c:d=26:68:12:54=13:34:6:27.$$

For the apparatus manufactured according to the data, a pitch angle of the seat is adjusted to 0-32°, which is an optimal choice meeting the requirement for sitting posture comfort adjustment of a majority of passengers. If an adjusting angle is too small, an adaptive surface of the passenger is not wide enough; while if the adjusting angle is too large, arrangement of an overall structure may be affected.

As a preferred solution, the included angle between the connecting bracket and each of the left execution bracket and the right execution bracket is the proper obtuse angle of 110-130°.

As a preferred solution, the seat is provided with a backrest adjusting mechanism, a waist adjusting mechanism, a shoulder adjusting mechanism and a leg rest adjusting mechanism.

Because the present invention mainly relates to an apparatus for achieving a lying posture in a vehicle, adjusting apparatuses for leg rests, a backrest and the like are not described specifically.

Lying posture adjustment is achieved in such a way that a lead screw is pulled driven by the motor; then the front end execution mechanism rotates clockwise to drive the upper fixed bracket to lift up; and when the upper fixed bracket is lifted up to a required position, the apparatus is locked automatically. Meanwhile, the rear end supporting rod of the upper fixed bracket rotates to avoid overconstraint of the mechanism.

Lying posture return operation is achieved in such a way that the lead screw is pushed driven by the motor; then the front end execution mechanism rotates anticlockwise to drive the upper fixed bracket to descend; and when the upper fixed bracket descends to a specified position, the apparatus stops automatically. Meanwhile, hard retaining points are arranged on the surfaces, close to the left upper sliding rail and the right upper sliding rail, of front sides of the left fixed supporting rod and the right fixed supporting rod, so as to strengthen collision strength of an overall mechanism during lying posture return.

The present invention has the beneficial effects that:
1. By applying a hinge mechanism, an overall posture change is achieved, and the apparatus is simple in structure, very small in space proportion and simple and rapid in adjustment.
2. With preferred component fitting parameters, the apparatus is good in effect and wide in adaptive surface.
3. The apparatus is connected between the lower side of the height adjusting mechanism of the seat and the upper sides of upper sliding rails of the seat; and various adjusting mechanisms are independently operated without interfering each other and are operated briskly.
4. Because component fitting is lower pairs all, the apparatus is safe and durable.
5. The apparatus is simple and convenient to mount and debug and high in work efficiency.
6. A motion trajectory design is relatively simple.
7. The apparatus is easy to manufacture, reliable in quality and low in cost.

DETAILED DESCRIPTION OF PREFERRED EMBODIMENTS

The embodiments of the present invention are described in combination with drawings in detail below. The detailed implementations and the specific operation process are provided for the implementation of the embodiments according to the technical solution of the present invention, but the protection scope of the present invention is not limited to the following embodiments.

Figure 1:
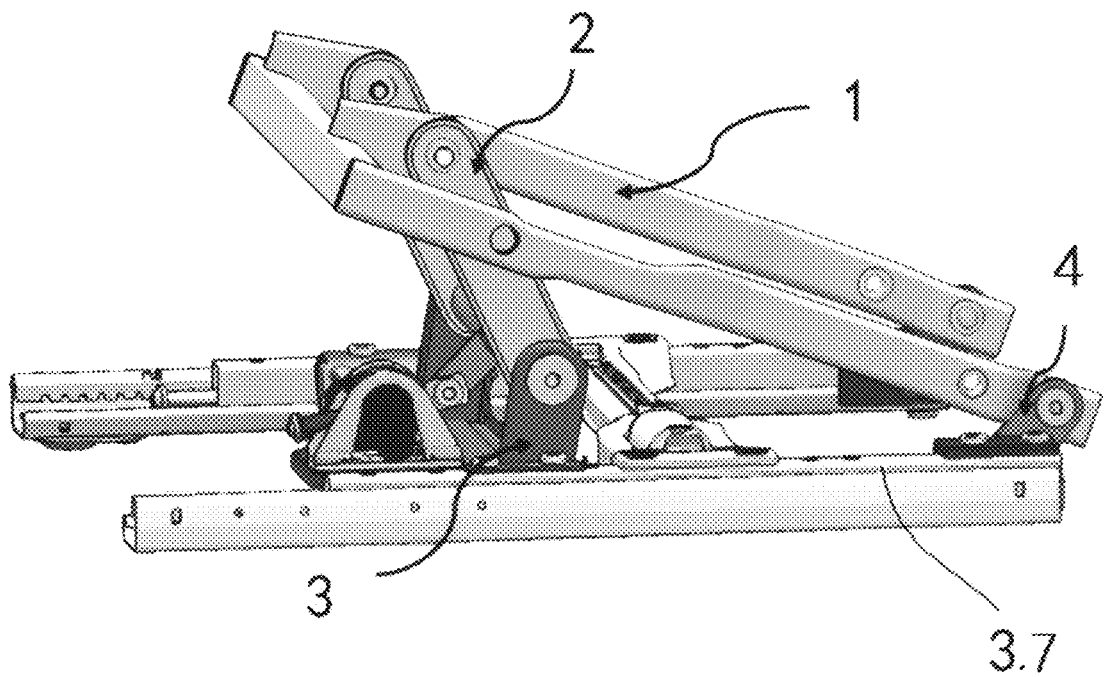
FIG. 1 is a schematic diagram of an assembly of the present invention.

An adjusting apparatus for achieving a lying posture in a vehicle seat, the apparatus is connected between a lower side of a height adjusting mechanism of the seat and upper sides of upper sliding rails of the seat and comprises an upper fixed bracket 1, a front end execution mechanism 2, a front end supporting and driving mechanism 3 and a rear end bracket assembly 4, referring to FIG. 1.

Figure 2:
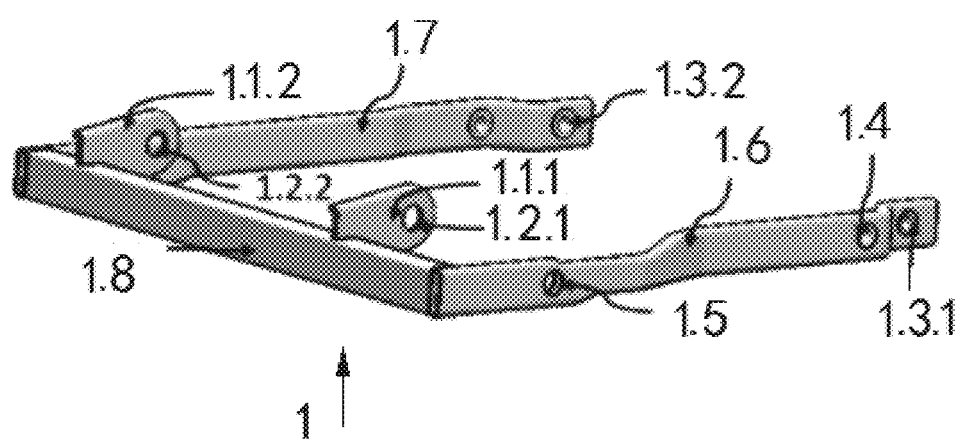
FIG. 2 is a three-dimensional schematic diagram of an upper fixed bracket.

The upper fixed bracket 1 is provided with a front end fixed supporting rod 1.8, a left end and a right end of which are fixedly connected with a left fixed supporting rod 1.6 and a right fixed supporting rod 1.7 respectively; inner sides of the left fixed supporting rod 1.6 and the right fixed supporting rod 1.7 are fixedly connected with a left fixed bracket 1.1.1 and a right fixed bracket 1.1.2 respectively; a connecting hole (comprising a front connecting hole 1.4 and a rear connecting hole 1.5) is formed in each of front parts and rear parts of the left fixed supporting rod 1.6 and the right front end fixed supporting rod 1.7 for being hinged to front and rear adjusting rods on a left side and a right side of the height adjusting mechanism; and lower ends of the seat height adjusting mechanism are symmetrically supported on the left fixed supporting rod 1.6 and the right fixed supporting rod 1.7, so as to achieve an independent height adjusting function, referring to FIG. 2.

Figure 3:
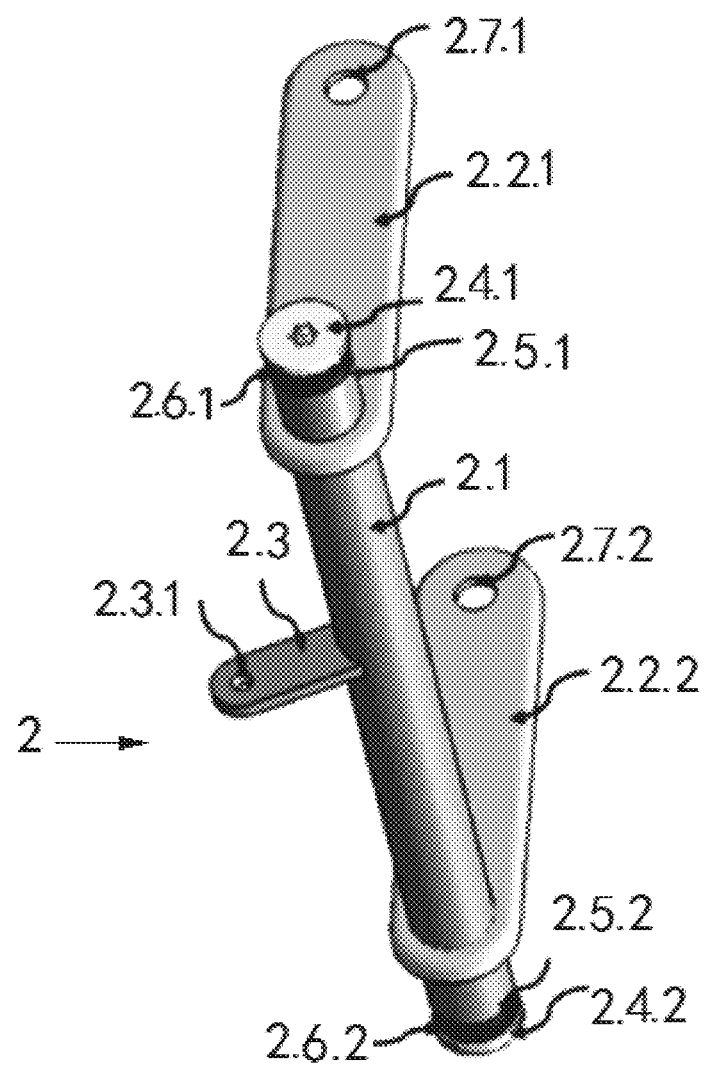
FIG. 3 is a three-dimensional schematic diagram of a front end execution mechanism.

The front end execution mechanism 2 comprises a hollow horizontal pipe 2.1; a left execution bracket 2.2.1 and a right execution bracket 2.2.2 are symmetrically welded to the hollow horizontal pipe 2.1; a left fixed bracket connecting hole 1.2.1 is hinged to a left traction connecting hole 2.7.1 of the left execution bracket 2.2.1; a right fixed bracket connecting hole 1.2.2 is hinged to a right traction connecting hole 2.7.2 of the right execution bracket 2.2.2; a middle part of the hollow horizontal pipe 2.1 is welded to a connecting bracket 2.3; and an included angle between the connecting bracket 2.3 and each of the left execution bracket 2.2.1 and the right execution bracket 2.2.2 is a proper obtuse angle with a specific value range of 110-130°. A left welding nut 2.5.1 and a right welding nut 2.5.2 are welded to two ends of the hollow horizontal pipe 2.1; a left boss bolt 2.4.1 and the left welding nut 2.5.1 are connected with each other through a left bushing 2.6.1; a right boss bolt 2.4.2 and the right welding nut 2.5.2 are connected with each other through a right bushing 2.6.2; and a lower end of the connecting bracket 2.3 is rotationally connected with a front end of a motor lead screw 3.4.1 through a drive connecting hole 2.3.1, referring to FIG. 3.

Figure 4:
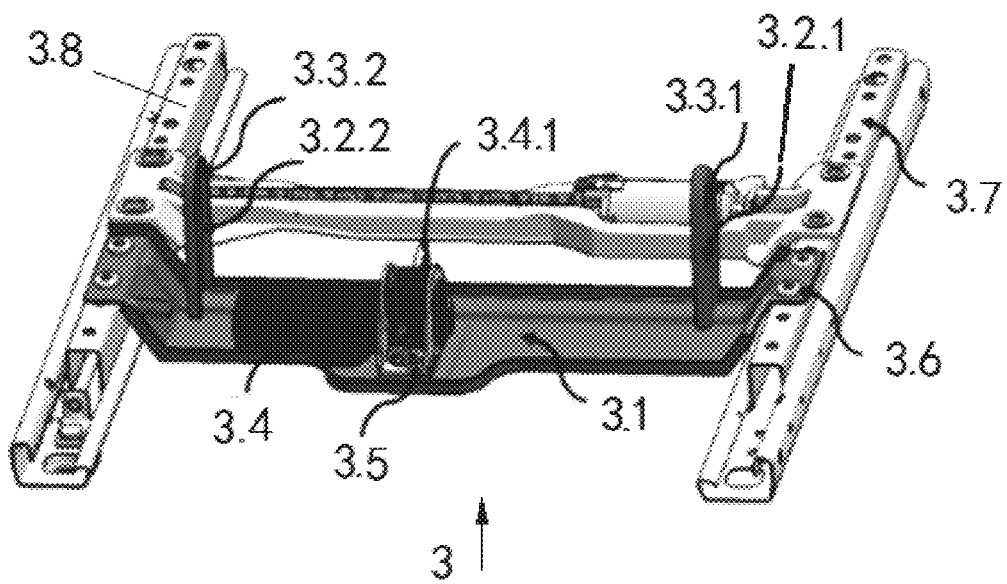
FIG. 4 is a three-dimensional schematic diagram of a front end supporting and driving mechanism.

The front end supporting and driving mechanism 3 comprises a motor base 3.1 connected with a left upper sliding rail 3.7 and a right upper sliding rail 3.8 through bolts 3.6; a motor 3.4 is fixed to the motor base 3.1 through a motor connecting bolt 3.5; bottom ends of a left motor bracket 3.2.1 and a right motor bracket 3.2.2 are fixedly connected to the motor base 3.1 through welding; and upper ends of the left motor bracket 3.2.1 and the right motor bracket 3.2.2 are rotatably connected to the front end execution mechanism 2, referring to FIG. 4.

Figure 5:
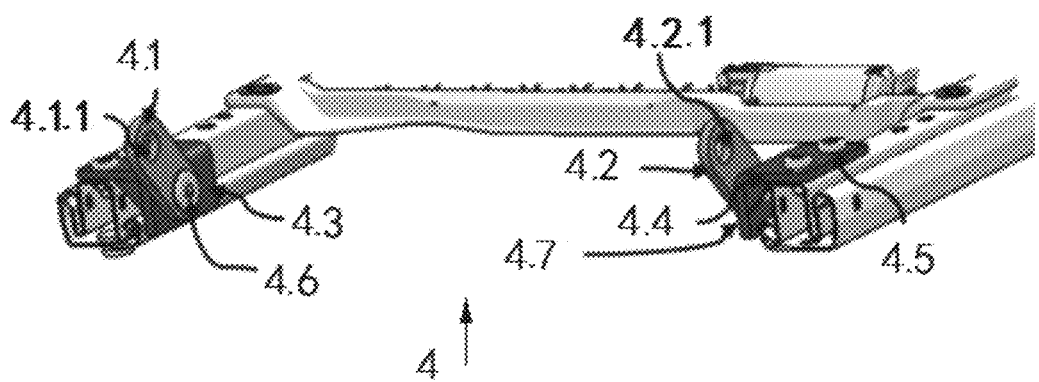
FIG. 5 is a schematic diagram of a rear end bracket assembly.

The rear end bracket assembly 4 comprises a left rear bracket 4.3 fixedly connected with the left upper sliding rail 3.7 through bolts 4.5 and aright rear bracket 4.4 fixedly connected with the right upper sliding rail 3.8 using bolts 4.5 symmetrically; a left rear supporting rod 4.1 is rotationally connected with the left rear bracket 4.3 using a boss bolt 4.6; and a right rear supporting rod 4.2 is rotationally connected with the right rear bracket 4.4 using a boss bolt 4.7, referring to FIG. 5.

The upper fixed bracket 1 has a function of supporting height adjustment supporting rods of the seat, and separating height adjustment from the sliding rails, so as to achieve independent adjustment on height and lying posture.

For the apparatus, a length ratio of various connecting rods complies with a following preferred rule, and scaling may be conducted according to this ratio based on an actual structure demand. Specifically, if a distance between hinged rotating axes of the two ends of the left execution bracket 2.2.1 and the right execution bracket 2.2.2 is a, a distance between an axis of the left fixed bracket connecting hole 1.2.1 and the right fixed bracket connecting hole 1.2.2 and an axis of the left fixed supporting rod connecting hole 1.3.1 and the right fixed supporting rod connecting hole 1.3.2 is b, a distance between an axis of the left upper connecting hole 4.1.1 of the left rear supporting rod 4.1 and the right upper connecting hole 4.2.1 of the right rear supporting rod 4.2 and an axis of the boss bolt 4.6 for connecting the left rear supporting rod 4.1 and the boss bolt 4.7 for connecting the right rear supporting rod 4.2 is c, and a distance between an axis of the left motor bracket connecting hole 3.3.1 and the right motor bracket connecting hole 3.3.2 and an axis of the boss bolt 4.6 for connecting the left rear supporting rod 4.1 and the boss bolt 4.7 for connecting the right rear supporting rod 4.2 is d, then $$a:b:c:d=26:68:12:54=13:34:6:27.$$

For the apparatus manufactured according to the data, a pitch angle of the seat is adjusted to 0-32°, which is an optimal choice meeting the requirement for sitting posture comfort adjustment of a majority of passengers. If an adjusting angle is too small, an adaptive surface of the passenger is not wide enough; while if the adjusting angle is too large, arrangement of an overall structure may be affected.

The seat using the apparatus is also provided with a backrest adjusting mechanism, a waist adjusting mechanism, a shoulder adjusting mechanism and a leg rest adjusting mechanism.

Figure 6:
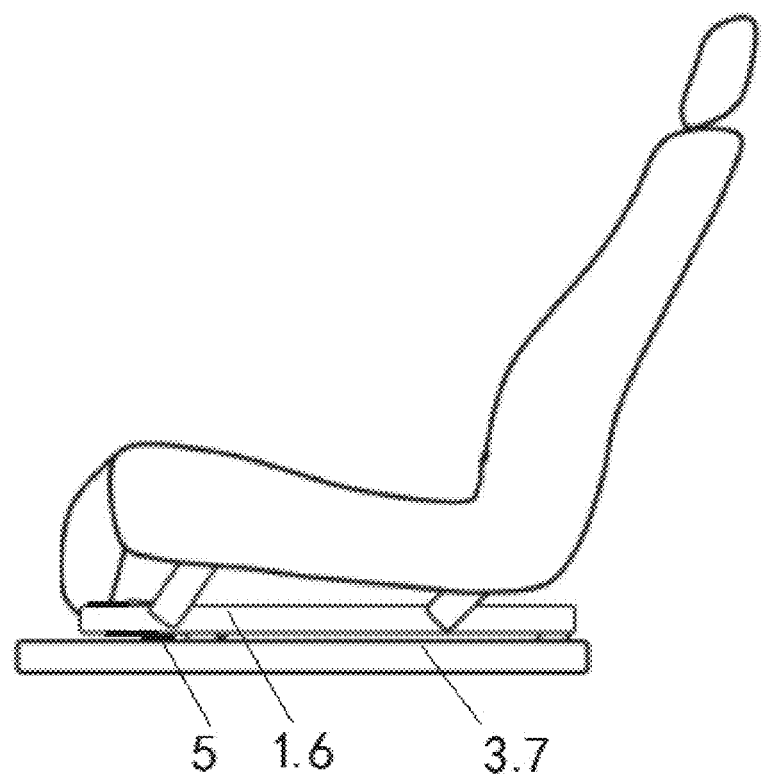
FIG. 6 is a schematic diagram of an initial position or a reset form of a seat.

FIG. 6 is a schematic diagram of an initial position or a reset form of a seat. A lead screw is pushed driven by the motor; then the front end execution mechanism 2 rotates anticlockwise to drive the upper fixed bracket 1 to descend; and when the upper fixed bracket 1 descends to a specified position, the mechanism stops automatically. Meanwhile, hard retaining points 5 are arranged on the surfaces, close to the left upper sliding rail 3.7 and the right upper sliding rail 3.8, of front sides of the left fixed supporting rod 1.6 and the right fixed supporting rod 1.7, so as to strengthen collision strength of an overall mechanism during lying posture return.

Figure 7:
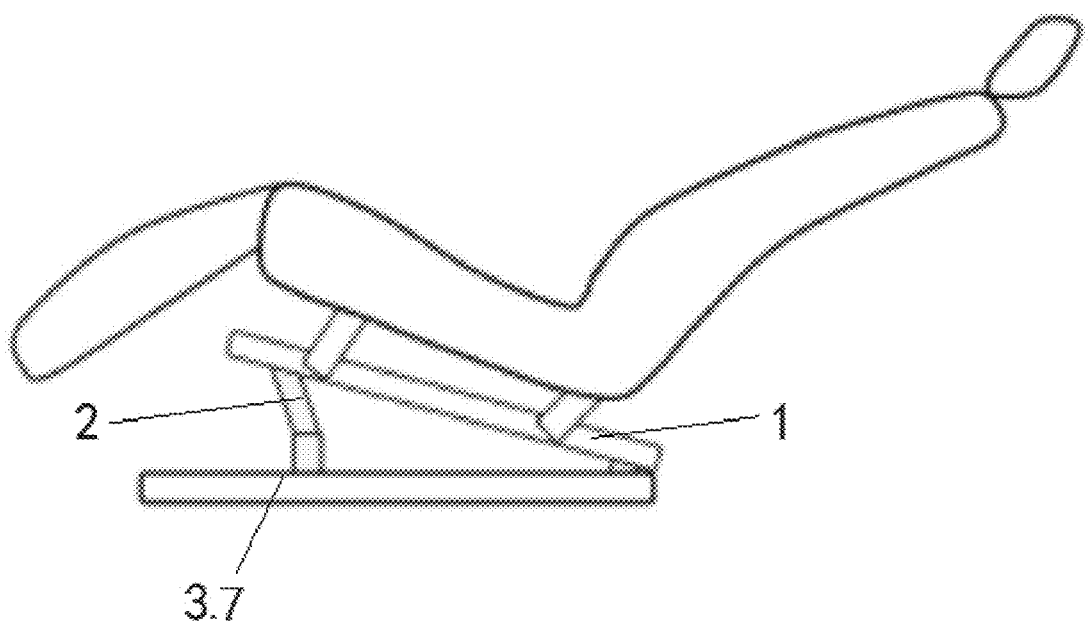
FIG. 7 is a schematic diagram of a lying posture form of a vehicle seat.

FIG. 7 is a schematic diagram of a lying posture form of a vehicle seat.

The above shows and describes the basic principle, main features and advantages of the present invention. Those skilled in the art shall understand that the present invention is not limited by the above embodiment. The above embodiment and description merely illustrate the principle of the present invention. Various changes and improvements can also be made to the present invention without departing from the spirit and scope of the present invention, and shall fall into the protection scope of the present invention. The protection scope of the present invention is defined by the appended claims and equivalents.

We claim:

1. An adjusting apparatus for achieving a lying posture in a vehicle seat, connected between a lower side of a height adjusting mechanism of the seat and upper sides of upper sliding rails of the seat, comprising an upper fixed bracket, a front end execution mechanism, a front end supporting and driving mechanism and a rear end bracket assembly, wherein the upper fixed bracket is provided with a front end fixed supporting rod, a left end and a right end of which are fixedly connected with a left fixed supporting rod and a right fixed supporting rod respectively; inner sides of the left fixed supporting rod and the right fixed supporting rod are fixedly connected with a left fixed bracket and a right fixed bracket respectively; and a connecting hole is formed in each of front parts and rear parts of the left fixed supporting rod and the right fixed supporting rod for being hinged to front and rear adjusting rods on a left side and a right side of the height adjusting mechanism;

the front end execution mechanism comprises a hollow horizontal pipe; a left execution bracket and a right execution bracket are symmetrically welded to the hollow horizontal pipe; a left fixed bracket connecting hole of the left fixed bracket is hinged to a left traction connecting hole of the left execution bracket; a right fixed bracket connecting hole of the right fixed bracket is hinged to a right traction connecting hole of the right execution bracket; a middle part of the hollow horizontal pipe is welded to a connecting bracket; an included angle between the connecting bracket and each of the left execution bracket and the right execution bracket is a proper obtuse angle; a left welding nut and a right welding nut are welded to two ends of the hollow horizontal pipe; a left boss bolt and the left welding nut are connected with each other through a left bushing; a right boss bolt and the right welding nut are connected with each other through a right bushing; and a lower end of the connecting bracket is rotationally connected with a front end of a motor lead screw through a drive connecting hole;

the front end supporting and driving mechanism comprises a motor base connected with a left upper sliding rail and a right upper sliding rail through bolts; a motor is fixed to the motor base through a motor connecting bolt; bottom ends of a left motor bracket and a right motor bracket are fixedly connected to the motor base through welding; and upper ends of the left motor bracket and the right motor bracket are rotatably connected to the front end execution mechanism;

the rear end bracket assembly comprises a left rear bracket fixedly connected with the left upper sliding rail through bolts and a right rear bracket fixedly connected with the right upper sliding rail using bolts symmetrically; a left rear supporting rod is rotationally connected with the left rear bracket using a boss bolt; and a right rear supporting rod is rotationally connected with the right rear bracket using a boss bolt.

2. The adjusting apparatus for achieving the lying posture in the vehicle seat according to claim 1, wherein the seat is provided with a backrest adjusting mechanism, a waist adjusting mechanism, a shoulder adjusting mechanism and a leg rest adjusting mechanism.

\* \* \* \* \*